US010227672B2

(12) United States Patent
Hasegawa et al.

(10) Patent No.: US 10,227,672 B2
(45) Date of Patent: Mar. 12, 2019

(54) HIGH-STRENGTH HOT-DIP GALVANIZED STEEL SHEET AND METHOD FOR PRODUCING THE SAME

(71) Applicant: JFE STEEL CORPORATION, Tokyo (JP)

(72) Inventors: Hiroshi Hasegawa, Fukuyama (JP); Shinjiro Kaneko, Chiba (JP); Yoichi Makimizu, Fukuyama (JP); Yoshitsugu Suzuki, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 347 days.

(21) Appl. No.: 15/106,606

(22) PCT Filed: Dec. 1, 2014

(86) PCT No.: PCT/JP2014/005982
§ 371 (c)(1),
(2) Date: Jun. 20, 2016

(87) PCT Pub. No.: WO2015/092987
PCT Pub. Date: Jun. 25, 2015

(65) Prior Publication Data
US 2017/0037488 A1    Feb. 9, 2017

(30) Foreign Application Priority Data
Dec. 18, 2013    (JP) ................ 2013-260986

(51) Int. Cl.
| C22C 38/38 | (2006.01) |
| C22C 38/26 | (2006.01) |
| C22C 38/28 | (2006.01) |
| C21D 9/46 | (2006.01) |
| C21D 8/02 | (2006.01) |
| C23C 2/06 | (2006.01) |
| C23C 2/02 | (2006.01) |
| C23C 2/28 | (2006.01) |
| C22C 38/00 | (2006.01) |
| C22C 38/58 | (2006.01) |
| B32B 15/01 | (2006.01) |
| C22C 38/02 | (2006.01) |
| C22C 38/06 | (2006.01) |
| C22C 38/20 | (2006.01) |
| C22C 38/22 | (2006.01) |
| C22C 38/24 | (2006.01) |
| C22C 38/32 | (2006.01) |
| C22C 38/48 | (2006.01) |
| C22C 38/50 | (2006.01) |
| C22C 38/54 | (2006.01) |
| C21D 1/22 | (2006.01) |
| C21D 6/00 | (2006.01) |

(52) U.S. Cl.
CPC .............. *C21D 9/46* (2013.01); *B32B 15/013* (2013.01); *C21D 1/22* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/00* (2013.01); *C22C 38/001* (2013.01); *C22C 38/002* (2013.01); *C22C 38/005* (2013.01); *C22C 38/02* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/48* (2013.01); *C22C 38/50* (2013.01); *C22C 38/54* (2013.01); *C22C 38/58* (2013.01); *C23C 2/02* (2013.01); *C23C 2/06* (2013.01); *C23C 2/28* (2013.01); *C21D 2211/005* (2013.01); *C21D 2211/008* (2013.01)

(58) Field of Classification Search
None
See application file for complete search history.

(56) References Cited

FOREIGN PATENT DOCUMENTS

| EP | 2 765 212 A1 | 8/2014 |
| JP | 2010-070843 A | 4/2010 |
| JP | 2011-132602 A | 7/2011 |
| JP | 2012-031462 A | 2/2012 |
| JP | 2012-229466 A | 11/2012 |
| JP | 2013-216946 A | 10/2013 |
| JP | 5327140 B2 | 10/2013 |
| JP | 2013-227654 A | 11/2013 |
| WO | 2013051238 A1 | 4/2013 |

OTHER PUBLICATIONS

Feb. 17, 2017 Office Action issued in Chinese Patent Application No. 201480068976.0.
Nov. 25, 2016 Search Report issued in European Patent Application No. 14871118.7.
Feb. 24, 2015 Search Report issued in International Application No. PCT/JP2014/005982.

*Primary Examiner* — Deborah Yee
(74) *Attorney, Agent, or Firm* — Oliff PLC

(57) ABSTRACT

A high-strength hot-dip galvanized steel sheet having a surface coated with a hot-dip galvanized coating, the steel sheet having a chemical composition comprising C: more than 0.10% and less than 0.18%, Si: 0.01 to 1.00%, Mn: 1.5 to 4.0%, P: 0.100% or less, S: 0.020% or less, Al: 0.010 to 0.500%, Cr: 0.010 to 2.000%, Nb: 0.005 to 0.100%, Ti: 0.005 to 0.100%, B: more than 0.0005% and 0.0030% or less, and Fe and incidental impurities, and a method for producing the same. The steel sheet has a microstructure including ferrite having an area fraction in the range of 0 to 10%, martensite having an area fraction in the range of 15 to 60%, tempered martensite having an area fraction in the range of 20 to 50%, and bainitic ferrite having an area fraction in the range of 20 to 50%.

16 Claims, No Drawings

HIGH-STRENGTH HOT-DIP GALVANIZED STEEL SHEET AND METHOD FOR PRODUCING THE SAME

This application is a national stage of PCT/JP2014/005982, filed Dec. 1, 2014, which claims priority to Japanese Application No. 2013-260986, filed Dec. 18, 2013. The entire contents of the prior applications are hereby incorporated by reference herein in their entirety.

TECHNICAL FIELD

This application relates to a high-strength hot-dip galvanized steel sheet suitable for an automotive steel sheet application and excellent in anti-crash property and bendability and also relates to a method for producing the steel sheet.

BACKGROUND

From the viewpoint of global environmental conservation, a constant and important issue in the automotive industry in order to reduce $CO_2$ emissions is to improve the fuel consumption of automobiles by reducing the weight of their bodies while the strength of the bodies is maintained. To achieve a reduction in the weight of automobile bodies while their strength is maintained, it is effective to increase the strength of steel sheets used as the materials of automobile parts to thereby allow the thickness of the steel sheets to be reduced. Many automobile parts made of steel sheet materials are formed by press forming, burring, etc. Therefore, high-strength steel sheets used as the materials of automobile parts are required to have, in addition to desired strength, high formability.

In recent years, ultra-high-strength steel sheets having a tensile strength TS of over 1,180 MPa are increasingly used as the materials of frames of automobile bodies. However, these ultra-high-strength steel sheets are difficult to form, and it is difficult to use conventional press forming without any modification, so that processing including mainly bending, such as roll forming, is often used. Therefore, bendability is one of the most important properties when over 1,180 MPa grade ultra-high-strength steel sheets are used. One of the important properties of the materials of automobile parts is anti-crash property. At the time of the collision of an automobile, parts formed of steel sheets are subjected to a strain rate as high as $10^3$/sec. Therefore, automobile parts such as pillars, members, and bumpers are required to have anti-crash property sufficient for ensuring the safety of an occupant in case of collision during driving of the automobile. Specifically, it is necessary to use high-strength steel sheets having anti-crash property, i.e., having a high ability to absorb collision energy even when the steel sheets are subjected to a high strain rate at the time of collision as descried above, to thereby ensure the collision safety of the automobile.

To address these requirements, Patent Literature 1, for example, discloses a technique for an ultra-high-strength steel sheet having a TS of 1,180 MPa grade and excellent in formability and anti-crash property. Patent Literatures 2 and 3 disclose techniques for high-strength steel sheets having good bendability, good spot weldability, etc.

CITATION LIST

Patent Literature

[PTL 1] Japanese Unexamined Patent Application Publication No. 2012-31462

[PTL 2] Japanese Unexamined Patent Application Publication No. 2011-132602

[PTL 3] Japanese Unexamined Patent Application Publication No. 2010-070843

SUMMARY

Technical Problem

In Patent Literature 1, however, although good formability such as ductility and stretch flangeability are achieved, no consideration is given to bendability. In Patent Literatures 2 and 3, anti-crash property is not evaluated. It is not assumed that the techniques disclosed in Patent Literatures 2 and 3 are applied to ultra-high-strength steel sheets having a TS of over 1,180 MPa.

The disclosed embodiments have been made in view of the above circumstances, and it is an object to provide a high-strength hot-dip galvanized steel sheet having a tensile strength (TS) of 1,180 MPa or more, excellent in anti-crash property and bendability, and suitable for the materials of automobile parts and to provide a method for producing the steel sheet.

Solution to Problem

To achieve the above object, extensive studies were conducted on the composition and structure of steel sheets and their production method and the following was found.

A high-strength hot-dip galvanized steel sheet having a TS of 1,180 MPa or more and excellent in anti-crash property and bendability can be obtained when the steel sheet has a specific composition and satisfies the following. The area fraction of ferrite is 0 to 10%; the area fraction of bainitic ferrite is 20 to 50%; the area fraction of tempered martensite is 20 to 50%; and the area fraction of martensite is 15 to 60%. Massive martensite, the tempered martensite, and the bainitic ferrite each have an average grain size of 15 μm or less; a value obtained by subtracting the area fraction of the tempered martensite from the area fraction of the bainitic ferrite is 20% or less; the area fraction of martensite phase regions which are contiguous only to martensite phase regions with respect to the total area fraction of martensite phase regions (i.e., the area fraction of martensite phase regions which are contiguous only to martensite phase regions with respect to all the martensite phase regions) is 5% or less; and a value obtained by subtracting the Vickers hardness at a depth of 20 μm from a surface of the steel sheet from the Vickers hardness at a depth of 100 μm from the surface of the steel sheet is 30 or more. Moreover, it has been found that a high-strength hot-dip galvanized steel sheet having a TS of 1,180 MPa or more and excellent in anti-crash property and bendability can be obtained by controlling hot rolling conditions, cold rolling conditions, and annealing conditions.

The disclosed embodiments have been completed on the basis of the above findings, and the gist of the disclosed embodiments is as follows.

[1] A high-strength hot-dip galvanized steel sheet with a hot-dip galvanized coating on a surface thereof, the high-strength hot-dip galvanized steel sheet having a composition containing, by mass %, C: more than 0.10% and less than 0.18%, Si: 0.01 to 1.00%, Mn: 1.5 to 4.0%, P: 0.100% or less, S: 0.020% or less, Al: 0.010 to 0.500%, Cr: 0.010 to 2.000%, Nb: 0.005 to 0.100%, Ti: 0.005 to 0.100%, and B: more than 0.0005% and 0.0030% or less, with the balance being Fe and inevitable impurities, wherein the high-strength hot-dip galvanized steel sheet has a microstructure including ferrite with an area fraction of 0 to 10%, martensite with an area fraction of 15 to 60%, tempered martensite with an area fraction of 20 to 50%, and bainitic ferrite with an area fraction of 20 to 50%, wherein massive martensite, the tempered martensite, and the bainitic ferrite each have an average grain size of 15 μm or less, wherein a value obtained by subtracting the area fraction of the tempered martensite from the area fraction of the bainitic ferrite is 20% or less, wherein an area fraction of martensite phase regions which are contiguous only to martensite phase regions with respect to a total area fraction of martensite phase regions is 5% or less, and wherein a value obtained by subtracting a Vickers hardness at a depth of 20 μm from a surface of the steel sheet from a Vickers hardness at a depth of 100 μm from the surface of the steel sheet is 30 or more.

[2] The high-strength hot-dip galvanized steel sheet according to [1], further containing, by mass %, at least one element selected from Mo: 0.005 to 2.000%, V: 0.005 to 2.000%, Ni: 0.005 to 2.000%, and Cu: 0.005 to 2.000%.

[3] The high-strength hot-dip galvanized steel sheet according to [1] or [2], further containing, by mass %, at least one element selected from Ca: 0.001 to 0.005% and REMs: 0.001 to 0.005%.

[4] The high-strength hot-dip galvanized steel sheet according to any of [1] to [3], wherein the hot-dip galvanized coating is a hot-dip galvannealed coating.

[5] A method for producing a high-strength hot-dip galvanized steel sheet, the method comprising: hot-rolling a slab having the components specified in any of [1] to [3] at a finishing rolling temperature of 850 to 950° C. such that a rolling reduction ratio in a final finishing pass is 10% or more; cooling the resultant slab such that a residence time at 600 to 700° C. is 10 seconds or shorter; coiling the resultant slab at a coiling temperature of 450° C. or higher and lower than 600° C. to form a hot-rolled sheet; cold-rolling the hot-rolled sheet at a rolling reduction ratio of more than 20% to form a cold-rolled sheet; annealing the cold-rolled sheet at an annealing temperature of ($Ac_3$ transformation temperature −20) to 950° C. by heating the cold-rolled sheet such that, in a temperature range of from 300° C. to the annealing temperature, the cold-rolled sheet is heated at an average heating rate of 0.5° C./sec. or more with a dew point of −45 to 20° C. and an air ratio of 0.80 or more and then holding the cold-rolled sheet at the annealing temperature for a holding time of 10 to 1,000 seconds; cooling the resultant cold-rolled sheet to a cooling stop temperature of 200° C. or higher and lower than 450° C. at an average cooling rate of 5° C./sec. or more; holding the cold-rolled sheet at the cooling stop temperature for a holding time of 1 second or longer and shorter than 10 seconds; then reheating the cold-rolled sheet to a reheating temperature of 450 to 550° C. and holding the cold-rolled sheet at the reheating temperature for 10 to 1,000 seconds; and then subjecting the resultant cold-rolled sheet to hot-dip galvanizing treatment.

[6] The method for producing a high-strength hot-dip galvanized steel sheet according to [5], the method further comprising, after the hot-dip galvanizing treatment, subjecting the galvanized cold-rolled sheet to galvannealing treatment.

Advantageous Effects

According to the disclosed embodiments, a high-strength hot-dip galvanized steel sheet having a TS of 1,180 MPa or more, excellent in anti-crash property and bendability, and suitable for the materials of automobile parts can be obtained.

DETAILED DESCRIPTION

The details of the disclosed embodiments will next be described. "%" representing the content of a component element means "% by mass" unless otherwise specified.

1) Composition

C: More than 0.10% and Less than 0.18%

C is an element necessary to increase the strength of martensite and tempered martensite to increase the TS. If the amount of C is 0.10% or less, the strength of the martensite and tempered martensite is low, and the TS cannot be 1,180 MPa or more. If the amount of C is 0.18% or more, the anti-crash property deteriorates. Therefore, the amount of C is more than 0.10% and less than 0.18% and preferably more than 0.10% to 0.15%.

Si: 0.01 to 1.00%

Si is an element effective in increasing the TS through solid solution strengthening of the steel. To achieve this effect, the amount of Si must be 0.01% or more. If the amount of Si exceeds 1.00%, galvanizability and weldability deteriorate. Therefore, the amount of Si is 0.01 to 1.00%. The amount of Si is preferably 0.01 to 0.80% and more preferably 0.01 to 0.60%.

Mn: 1.5 to 4.0%

Mn increases the TS through solid solution strengthening of the steel. In addition, Mn is an element that suppresses ferrite transformation and bainite transformation to allow martensite to form to thereby increase the TS. To achieve this effect, the amount of Mn must be 1.5% or more. If the amount of Mn exceeds 4.0%, the amount of inclusions increases significantly, and this causes deterioration of cleanliness and anti-crash property of the steel. Therefore, the amount of Mn is 1.5 to 4.0%. The amount of Mn is preferably 1.8 to 3.5% and more preferably 2.0 to 3.0%.

P: 0.100% or Less

P segregates at grain boundaries, and this causes deterioration of the anti-crash property and weldability. Desirably, the amount of P is as small as possible. However, the amount of P is 0.100% or less, in terms of production cost etc. The lower limit of the amount of P is not particularly specified. If the amount of P is less than 0.001%, production efficiency becomes low. Therefore, the amount of P is preferably 0.001% or more.

S: 0.020% or Less

S is present in the form of inclusions such as MnS and causes deterioration of the weldability. Desirably, the amount of S is as small as possible. However, the amount of S is 0.020% or less, in terms of production cost etc. The lower limit of the amount of S is not particularly specified. If the amount of S is less than 0.0005%, production efficiency becomes low. Therefore, the amount of S is preferably 0.0005% or more.

Al: 0.010 to 0.500%

Al acts as a deoxidizer, and it is preferable to add Al in a deoxidizing step. To achieve this effect, the amount of Al must be 0.010% or more. If the amount of Al exceeds 0.500%, the risk of slab cracking during continuous casting increases. Therefore, the amount of Al is 0.010 to 0.500%.

Cr: 0.010 to 2.000%

Cr is an element that suppresses ferrite transformation and bainite transformation to allow martensite to form to thereby increase the TS. To achieve this effect, the amount of Cr must be 0.010% or more. If the amount of Cr exceeds 2.000%, the effect saturates, and an increase in cost results. Therefore, the amount of Cr is 0.010 to 2.000%. The amount of Cr is preferably 0.010 to 1.500% and more preferably 0.010 to 1.000%.

Nb: 0.005 to 0.100%

Nb is an element effective in suppressing recrystallization of ferrite during annealing to refine the grain size. To achieve this effect, the amount of Nb must be 0.005% or more. If the amount of Nb exceeds 0.100%, the effect saturates, and an increase in cost results. Therefore, the amount of Nb is 0.005 to 0.100%. The amount of Nb is preferably 0.010 to 0.080% and more preferably 0.010 to 0.060%.

Ti: 0.005 to 0.100%

Ti is an element effective in suppressing recrystallization of ferrite during annealing to refine the grain size. To achieve this effect, the amount of Ti must be 0.005% or more. If the amount of Ti exceeds 0.100%, the effect saturates, and an increase in cost results. Therefore, the amount of Ti is 0.005 to 0.100%. The amount of Ti is preferably 0.010 to 0.080% and more preferably 0.010 to 0.060%.

B: More than 0.0005% and 0.0030% or Less

B is an element effective in suppressing nucleation of ferrite and bainite from grain boundaries to obtain martensite. To achieve this effect, the amount of B must be more than 0.0005%. If the amount of B exceeds 0.0030%, the effect saturates, and an increase in cost results. Therefore, the amount of B is more than 0.0005% and 0.0030% or less. The amount of B is preferably more than 0.0005% and 0.0025% or less and more preferably more than 0.0005% and 0.0020% or less.

The balance is Fe and inevitable impurities.

If necessary, the steel sheet may appropriately contain at least one of the following elements.

The steel sheet may contain at least one selected from Mo: 0.005 to 2.000%, V: 0.005 to 2.000%, Ni: 0.005 to 2.000%, and Cu: 0.005 to 2.000%.

Mo, V. Ni, and Cu are elements effective for an increase in strength because they allow a low-temperature transformation phase such as martensite to form. To achieve this effect, it is preferable that the steel sheet contains at least one element selected from Mo, V, Ni, and Cu and the content of each of Mo, V. Ni, and Cu is 0.005% or more. If the content of any of Mo, V, Ni, and Cu exceeds 2.000%, its effect saturates, and an increase in cost results. Therefore, the content of each of Mo, V, Ni, and Cu is preferably 0.005 to 2.000%.

In the disclosed embodiments, the steel sheet may contain, in addition to the composition described above, at least one selected from Ca: 0.001 to 0.005% and REMs: 0.001 to 0.005%.

Ca and REMs are elements effective in controlling the morphology of sulfides to improve workability. To achieve this effect, it is preferable that the steel sheet contains at least one element selected from Ca and REMs and the content of each of Ca and REMs is 0.001% or more. If the content of any of Ca and REMs exceeds 0.005%, the cleanliness of the steel may be adversely affected, and properties such as bendability may deteriorate. Therefore, the content of each of Ca and REMs is preferably 0.001 to 0.005%.

2) Microstructure

Area Fraction of Ferrite: 0 to 10%

If the area fraction of the ferrite exceeds 10%, it is difficult to achieve anti-crash property and a TS of 1,180 MPa or more simultaneously. Therefore, the area fraction of the ferrite is 10% or less. The area fraction of the ferrite is preferably 5% or less and more preferably 2% or less. The ferrite in the disclosed embodiments is polygonal ferrite.

Area Fraction of Martensite: 15 to 60%

The martensite has an effect of increasing strength and is necessary to achieve a TS of 1,180 MPa or more. If the area fraction of the martensite is less than 15%, it is difficult to achieve a TS of 1,180 MPa or more. If the area fraction of the martensite exceeds 60%, the bendability deteriorates. Therefore, the area fraction of the martensite is 15 to 60% and preferably 20 to 55%.

Area Fraction of Tempered Martensite: 20 to 50%.

The tempered martensite is effective in improving the anti-crash property and bendability. If the area fraction of the tempered martensite is less than 20%, this effect cannot be achieved sufficiently. If the area fraction of the tempered martensite exceeds 50%, it is difficult to achieve a TS of 1,180 MPa or more. Therefore, the area fraction of the tempered martensite is 20 to 50%. The area fraction of the tempered martensite is preferably 25 to 45% and more preferably 25 to 40%.

Area Fraction of Bainitic Ferrite: 20 to 50%

The bainitic ferrite is effective in improving the bendability of the steel without significant deterioration of the strength and anti-crash property. If the area fraction of the bainitic ferrite is less than 20%, this effect cannot be achieved sufficiently. If the area fraction of the bainitic ferrite exceeds 50%, it is difficult to achieve a TS of 1,180 MPa or more. Therefore, the area fraction of the bainitic ferrite is 20 to 50%. The area fraction of the bainitic ferrite is preferably 25 to 45% and more preferably 25 to 40%.

Average Grain Size of Each of Massive Martensite, Tempered Martensite, and Bainitic Ferrite: 15 µm or Less In the disclosed embodiments, it is important that main structures, i.e., the martensite, the tempered martensite, and the bainitic ferrite, are fine. When the martensite structures, i.e., massive martensite and the tempered martensite, and the bainitic ferrite are fine, the anti-crash property and bendability are improved. If the average grain size of each of the massive martensite, the tempered martensite, and the bainitic ferrite exceeds 15 µm, the anti-crash property and bendability deteriorate. Therefore, the average grain size of each of the massive martensite, the tempered martensite, and the bainitic ferrite is 15 µm or less. The average grain size is preferably 12 µm or less and more preferably 10 µm or less. In the disclosed embodiments, the massive martensite is martensite including prior-austenite grain boundaries and does not encompass martensitic islands in the bainitic ferrite.

Value Obtained by Subtracting Area Fraction of Tempered Martensite from Area Fraction of Bainitic Ferrite: 20% or Less When a value obtained by subtracting the area fraction of the tempered martensite from the area fraction of the bainitic ferrite exceeds 20° 1, the bendability deteriorates. Although the mechanism of the deterioration is unclear, the reason may be as follows. The tempered martensite has a hardness between the hardness of the bainitic ferrite and the hardness of the martensite and may contribute to uniformization of the distribution of strain. If the amount of the bainitic ferrite is excessively large, the tempered martensite does not act as an intermediate layer sufficiently, and therefore the bendability deteriorates. If the amount of the bainitic ferrite is excessively small, ductility deteriorates, and this causes deterioration of the bendability. Therefore, the value obtained by subtracting the area fraction of the tempered martensite from the area fraction of the bainitic ferrite is 20% or less. This value can be 0% or less.

Ratio of Area Fraction of Martensite Phase Regions which are Contiguous Only to Martensite Phase Regions to Total Area Fraction of Martensite Phase Regions (Area Fraction of Martensite Phase Regions which are Contiguous Only to Martensite Phase Regions with Respect to all Martensite Phase Regions): 5% or Less When a plurality of hard martensite regions are contiguous to each other, i.e., localization of the martensite occurs, strain is introduced non-uniformly during processing, collision, etc., and this causes deterioration of the bendability and anti-crash property. If the ratio of the area fraction of martensite phase regions which are contiguous only to martensite phase regions to the total area fraction of martensite phase regions exceeds 5%, the bendability and anti-crash property deteriorate significantly. Therefore, the ratio of the area fraction of martensite phase regions which are contiguous only to martensite phase regions to the total area fraction of martensite phase regions is 5% or less, preferably 3% or less, and more preferably 2% or less.

Value ($\Delta Hv$) Obtained by Subtracting Vickers Hardness at Depth of 20 μm from Surface of Steel Sheet from Vickers Hardness at Depth of 100 μm from Surface of Steel Sheet: 30 or More If $\Delta Hv$ obtained by subtracting the Vickers hardness ($Hv_{20}$) at a depth of 20 μm from the surface of the steel sheet from the Vickers hardness ($Hv_{100}$) at a depth of 100 μm from the surface of the steel sheet, i.e., ($Hv_{100}-Hv_{20}$), is less than 30, the bendability deteriorates. Although the mechanism of the deterioration is unclear, the reason may be as follows. During bending, a crack becomes noticeable when the crack extends to a depth of about 100 μm from the surface of the steel sheet. Therefore, to suppress fine cracks, it may be important to control not only the average properties of the steel sheet but also its properties in a region within 100 μm from the surface of the steel sheet. During bending, a strain gradient occurs from the surface of the steel sheet toward its interior. By forming a reverse strength gradient in the vicinity of the surface of the steel sheet in advance (such that the strength decreases toward the surface which is to be largely distorted), the occurrence and propagation of cracks may be suppressed. This strength gradient is represented by $\Delta Hv$ described above, and the bendability is improved when $\Delta Hv$ is 30 or more.

In addition to the ferrite, the martensite, the tempered martensite, and the bainitic ferrite, other phases such as retained austenite and pearlite may be contained. Even in this case, the object of the disclosed embodiments can be achieved, so long as the microstructural conditions described above are satisfied.

The area fractions of the ferrite, martensite, tempered martensite, and bainitic ferrite are the ratios of the areas of these phases to the area of observation. The area fraction of each phase is determined as follows. A cross section of the steel sheet in its thickness direction is polished and then etched with a 3% initial solution. Then images of three regions at a depth of one-fourth the thickness are taken under an SEM (scanning electron microscope) at a magnification of 1,500×. The area fraction of each phase is determined from the obtained image data using Image-Pro manufactured by Media Cybernetics. The area fraction of each phase is the average of the area fractions in the three images. In the image data, the above phases can be distinguished from each other because the ferrite appears black, the bainitic ferrite appears as black regions containing martensitic islands or as gray regions containing carbide regions with aligned orientations, the tempered martensite appears as light grey regions containing fine carbide regions with non-aligned orientations, and the martensite appears white.

The average grain size of each of the bainitic ferrite, the tempered martensite, and the massive martensite is determined as follows. In the image data used to determine the area fraction of each of the phases, the total area of one phase in the images is divided by the number of regions of this phase in the images to determine the average area of this phase, and the square root of the average area is used as the average grain size (corresponding to one side of a square (square approximation)).

3) Production Conditions

The high-strength steel sheet of the disclosed embodiments is characterized as follows. A slab having the above-described composition is hot-rolled at a finishing rolling temperature of 850 to 950° C. such that a rolling reduction ratio in a final finishing pass is 10% or more. The resultant slab is cooled such that a residence time at 600 to 700° C. is 10 seconds or shorter and is then coiled at a coiling temperature of 450° C. or higher and lower than 600° C. to form a hot-rolled sheet. The hot-rolled sheet is cold-rolled at a rolling reduction ratio of more than 20% to form a cold-rolled sheet. Then the cold-rolled sheet is annealed at an annealing temperature of ($Ac_3$ transformation temperature −20) to 950° C. by heating the cold-rolled sheet such that, in a temperature range of from 300° C. to the annealing temperature, the cold-rolled sheet is heated at an average heating rate of 0.5° C./sec. or more with a dew point of −45 to 20° C. and an air ratio of 0.80 or more and then holding the cold-rolled sheet at the annealing temperature for a holding time of 10 to 1,000 seconds. Then the resultant cold-rolled sheet is cooled at an average cooling rate of 5° C./sec. or more to a cooling stop temperature of 200° C. or higher and lower than 450° C. and held at the cooling stop temperature for a holding time of 1 second or longer and shorter than 10 seconds. Then the resultant cold-rolled sheet is reheated to a reheating temperature of 450 to 550° C. and held at the reheating temperature for 10 to 1,000 seconds. The resultant cold-rolled sheet is subjected to hot-dip galvanizing treatment.

First, the conditions of hot rolling will be described.

Rolling Reduction Ratio in Final Finishing Pass: 10% or More

In the finishing rolling step in the hot rolling, if the rolling reduction ratio in the final finishing pass is less than 10%, the difference in hardness $\Delta Hv$ in the surface layer of the steel sheet after annealing is less than 30, and the bendability deteriorates. Although the mechanism of the deterioration is unclear, the reason may be as follows. When the rolling reduction ratio in the finishing rolling is low, the structure of the surface layer of the hot-rolled sheet becomes coarse. This causes a reduction in the diffusion path of oxygen, so that a reduction in the amount of carbon in the vicinity of the surface layer is suppressed. Therefore, the rolling reduction ratio in the final finishing pass is 10% or more.

Finishing Rolling Temperature: 850 to 950° C.

If the finishing rolling temperature of the final finishing pass is lower than 850° C., the difference in hardness $\Delta Hv$ in the surface layer of the steel sheet after annealing is less than 30, and the bendability deteriorates. Although the mechanism of the deterioration is unclear, the reason may be as follows. When the finishing rolling temperature is low, an elongated structure remains in the surface layer of the steel sheet. This causes a reduction in the diffusion path of oxygen, so that a reduction in the amount of carbon in the vicinity of the surface layer is suppressed. If the finishing rolling temperature exceeds 950° C., the grains become coarse, so that the microstructure of the disclosed embodiments is not obtained. Therefore, the finishing rolling temperature is set to 850 to 950° C.

Cooling Such that Residence Time at 600 to 700° C. is 10 Seconds or Shorter

During cooling after the finishing rolling, if the residence time at 600 to 700° C. exceeds 10 seconds, B-containing compounds such as B carbide are produced, and this causes a reduction in the amount of B in the form of solid solution in the steel. The effect of B during annealing is thereby reduced, so that the microstructure of the disclosed embodiments is not obtained. Therefore, the residence time at 600 to 700° C. is 10 seconds or shorter. Preferably, the residence time is 8 seconds or shorter.

Coiling at Coiling Temperature of 450° C. or Higher and Lower than 600° C.

If the coiling temperature is 600° C. or higher, B-containing compounds such as B carbide are produced, and this causes a reduction in the amount of B in the form of solid solution in the steel. The effect of B during annealing is thereby reduced, so that the microstructure of the disclosed embodiments is not obtained. If the coiling temperature is lower than 450° C., supply of oxygen to the surface layer of the steel sheet is suppressed, so that a reduction in the amount of carbon in the vicinity of the surface layer is suppressed. In this case, the difference in hardness ΔHv in the surface layer of the steel sheet after annealing is less than 30, and the bendability deteriorates. Therefore, the coiling temperature is 450° C. or higher and lower than 600° C. and preferably 500° C. or higher and lower than 600° C.

Next, the conditions of cold rolling of the obtained hot-rolled sheet will be described.

Cold Rolling at Rolling Reduction Ratio of More than 20%

If the rolling reduction ratio is 20% or less, coarse grains are generated, and this causes deterioration of the anti-crash property. Therefore, the rolling reduction ratio in the cold rolling is more than 20% and preferably 30% or more. The upper limit is not particularly specified, and the rolling reduction ratio is preferably about 90% or less, from the viewpoint of shape stability etc.

Next, the conditions of annealing of the obtained cold-rolled sheet will be described.

Heating in Temperature Range of from 300° C. to Annealing Temperature at Average Heating Rate of 0.5° C./Sec. Or More with Dew Point of −45 to 20° C. and Air Ratio of 0.80 or More In the temperature range of from 300° C. to the annealing temperature, if the dew point of the atmosphere in a furnace is lower than −45° C., oxygen is not sufficiently supplied to the surface layer of the steel sheet, so that a reduction in the amount of carbon in the vicinity of the surface layer is suppressed. In this case, the difference in hardness ΔHv in the surface layer of the steel sheet after annealing is less than 30, and the bendability deteriorates. If the dew point exceeds 20° C., the galvanizability deteriorates. Therefore, from 300° C. to the annealing temperature, the dew point is −45 to 20° C. The dew point is preferably −40 to 0° C. and more preferably −40 to −10° C.

In the temperature range from 300° C. to the annealing temperature, if the air ratio during oxidation treatment is less than 0.80, oxygen is not sufficiently supplied to the surface layer of the steel sheet, so that a reduction in the amount of carbon in the vicinity of the surface layer is suppressed. In this case, the difference in hardness ΔHv in the surface layer of the steel sheet after annealing is less than 30, and the bendability deteriorates. Therefore, the air ratio is 0.80 or more, preferably 0.90 or more, and more preferably 1.00 or more. The upper limit of the air ratio is not particularly specified. However, if the air ratio exceeds 1.50, productivity is inhibited. Therefore, the air ratio is preferably 1.50 or less. The air ratio as used herein means the ratio of air to a fuel such as coke-oven gas (COG), which is a by-product gas in an ironworks. No particular limitation is imposed on the type of oxidation furnace for the oxidation treatment. Preferably, a direct heating furnace equipped with a direct fired burner is used. In the direct fired burner, air is mixed with a fuel such as coke-oven gas (COG), which is a by-product gas in an ironworks. Then the air-fuel mixture is combusted to produce a burner flame, and the burner flame is applied directly to the surface of the steel sheet to heat the steel sheet. COG, liquefied natural gas (LNG), etc. can be used as the fuel of the direct burner.

In the temperature range from 300° C. to the annealing temperature, if the average heating rate is less than 0.5° C./sec, the grains of austenite become coarse, and the microstructure of the disclosed embodiments is not obtained. Therefore, the average heating rate is 0.5° C./sec. or more.

Holding at Annealing Temperature of ($Ac_3$ Transformation Temperature−20) to 950° C. for 10 to 1,000 Seconds If the annealing temperature is lower than ($Ac_3$ transformation temperature −20)° C., the formation of the austenite is insufficient, and the amount of ferrite formed is excessively large, so that the microstructure of the disclosed embodiments is not obtained. If the annealing temperature exceeds 950° C., the grains of the austenite become coarse, and the microstructure of the disclosed embodiments is not obtained. Therefore, the annealing temperature is ($Ac_3$ transformation temperature −20) to 950° C. The annealing temperature is preferably ($Ac_3$ transformation temperature −10) to 900° C. and more preferably $Ac_3$ transformation temperature to 880° C. The $Ac_3$ transformation temperature is determined from formula (1) below.

$$Ac_3 \text{ transformation temperature } (°C.)=910-203\times[C]^{0.5}+44.7\times[Si]-30\times[Mn]-11\times[Cr] \quad (1)$$

Here, [C], [Si], [Mn], and [Cr] are amounts of the elements in the steel by mass %.

If the holding time at an annealing temperature of ($Ac_3$ transformation temperature −20) to 950° C. is less than 10 seconds, the formation of the austenite is insufficient, and the amount of ferrite formed is excessively large, so that the microstructure of the disclosed embodiments is not obtained. If the holding time exceeds 1,000 seconds, the grains of the austenite become coarse, and the microstructure of the disclosed embodiments is not obtained. Therefore, the holding time is 10 to 1,000 seconds and preferably 30 to 600 seconds.

Average Cooling Rate: 5° C./Sec. Or More

If the average cooling rate is less than 5° C./sec, the amounts of ferrite and bainite formed during cooling are excessively large, so that the microstructure of the disclosed embodiments is not obtained. Therefore, the average cooling rate is 5° C./sec. or more.

Cooling Stop Temperature: 200° C. or Higher and Lower than 450° C.

If the cooling stop temperature is 450° C. or higher, no tempered martensite is formed, and the microstructure of the disclosed embodiments is not obtained. If the cooling stop temperature is lower than 200° C., the amount of the tempered martensite is excessively large, and the microstructure of the disclosed embodiments is not obtained. Therefore, the cooling stop temperature is 200° C. or higher and lower than 450° C. The cooling stop temperature is preferably 250 to lower than 450° C. and more preferably 300 to 430° C.

Holding for Holding Time of 1 Second or Longer and Shorter than 10 Seconds

In the disclosed embodiments, the tempered martensite is 50% or less. In this case, if the holding time at a cooling stop temperature of 200° C. or higher and lower than 450° C. is less than 1 second, the distribution of the tempered martensite is non-uniform, and this causes deterioration of the anti-crash property. If the holding time is 10 seconds or more, bainite transformation proceeds excessively, and the microstructure of the disclosed embodiments is not obtained. Therefore, the holding time is 1 second or more and less than 10 seconds.

Reheating to Reheating Temperature of 450 to 550° C. and Holding at Reheating Temperature for 10 to 1,000 Seconds If the reheating temperature is lower than 450° C., the amount of bainite formed is excessive large, and the microstructure of the disclosed embodiments is not obtained. If the reheating temperature exceeds 550° C., the amount of ferrite formed is excessive large, and the microstructure of the disclosed embodiments is not obtained. Therefore, the cold-rolled sheet is reheated to 450 to 550° C.

If the holding time is less than 10 seconds, the bainite transformation is insufficient, and the microstructure of the disclosed embodiments is not obtained. If the holding time exceeds 1,000 seconds, the bainite transformation proceeds excessively, and the microstructure of the disclosed embodiments is not obtained. Therefore, the holding time is 10 to 1,000 seconds and preferably 30 to 500 seconds.

Next, the conditions of the hot-dip galvanizing treatment will be described.

Preferably, the hot-dip galvanizing treatment is performed by immersing the steel sheet obtained in the manner described above in a galvanizing bath at 440° C. or higher and 500° C. or lower and then controlling coating weight by, for example, gas wiping. The galvanized coating may be galvannealed. In this case, it is preferable to galvanneal the galvanized coating by holding the steel sheet in the temperature range of from 460° C. to 580° C. for 1 second or longer and 40 seconds or shorter. The galvanizing bath used is preferably a galvanizing bath containing Al in an amount of 0.08 to 0.18%.

The steel sheet subjected to the hot-dip galvanizing treatment or galvannealing treatment may be subjected to temper rolling for the purpose of shape correction and surface roughness adjustment. If the temper rolling reduction ratio in the temper rolling exceeds 0.5%, the bendability may deteriorate due to hardening of the surface layer. Therefore, the temper rolling reduction ratio is preferably 0.5% or less. The temper rolling reduction ratio is more preferably 0.3% or less. Coating treatment such as resin or oil and fat coating treatment may be performed.

No particular limitation is imposed on the other conditions of the production method. Preferably, the following conditions are employed.

In order to prevent macro segregation, it is preferable to produce the slab by a continuous casting method. The slab may be produced by an ingot-making method or a thin slab casting method. When the slab is hot-rolled, the slab may be first cooled to room temperature, then reheated, and subjected to hot-rolling. The slab may be placed in a heating furnace without cooling to room temperature and then hot-rolled. An energy-saving process may be used, in which the slab is hot-rolled directly after short heat retaining treatment. When the slab is heated, it is preferable to heat the slab to 1,100° C. or higher in order to dissolve carbides and to prevent an increase in rolling load. In order to prevent an increase in scale loss, the heating temperature of the slab is preferably 1,300° C. or lower.

When the slab is hot-rolled, a rough bar prepared by rough-rolling the slab may be heated, from the view point of preventing troubles during rolling when the heating temperature of the slab is low. A so-called continuous rolling process may be employed, in which rough bars are joined together and then subjected to continuous finishing rolling. In order to reduce the rolling load and to make the shape and material properties of the hot-rolled slab uniform, it is preferable that lubrication rolling that allows the coefficient of friction to be 0.10 to 0.25 is performed in all or part of passes of the finishing rolling.

The coiled steel sheet may be, for example, pickled to remove scales. After the pickling, cold rolling, annealing, and hot-dip galvanization are performed under the conditions described above.

Example

Steel ingots having compositions shown in Table 1 were produced using a vacuum melting furnace and then rolled into steel slabs. In Table 1, "N" means inevitable impurities.

TABLE 1

| Steel | Composition (% by mass) | | | | | | | | | | | | $Ac_3$ transformation temperature | Remarks |
|---|---|---|---|---|---|---|---|---|---|---|---|---|---|---|
| | C | Si | Mn | P | S | Al | N | Cr | Ti | Nb | B | Others | | |
| A | 0.12 | 0.50 | 2.3 | 0.020 | 0.001 | 0.035 | 0.003 | 0.600 | 0.016 | 0.040 | 0.0015 | — | 786 | Within range of disclosed embodiments |
| B | 0.11 | 0.10 | 2.6 | 0.015 | 0.002 | 0.033 | 0.004 | 0.630 | 0.018 | 0.045 | 0.0018 | — | 762 | Within range of disclosed embodiments |
| C | 0.15 | 0.10 | 2.2 | 0.020 | 0.002 | 0.022 | 0.002 | 0.830 | 0.023 | 0.037 | 0.0020 | — | 761 | Within range of disclosed embodiments |
| D | 0.12 | 0.30 | 2.4 | 0.027 | 0.003 | 0.019 | 0.005 | 0.650 | 0.061 | 0.033 | 0.0016 | — | 774 | Within range of disclosed embodiments |
| E | 0.13 | 0.30 | 2.5 | 0.012 | 0.001 | 0.041 | 0.001 | 0.600 | 0.059 | 0.012 | 0.0010 | — | 769 | Within range of disclosed embodiments |
| F | 0.11 | 0.20 | 2.8 | 0.005 | 0.002 | 0.031 | 0.003 | 0.560 | 0.020 | 0.041 | 0.0017 | Mo: 0.100 | 761 | Within range of disclosed embodiments |

TABLE 1-continued

| Steel | Composition (% by mass) | | | | | | | | | | | | $Ac_3$ transformation temperature | Remarks |
|---|---|---|---|---|---|---|---|---|---|---|---|---|---|---|
| | C | Si | Mn | P | S | Al | N | Cr | Ti | Nb | B | Others | | |
| G | 0.12 | 0.30 | 2.3 | 0.003 | 0.005 | 0.015 | 0.002 | 0.610 | 0.020 | 0.040 | 0.0008 | V: 0.050 | 777 | Within range of disclosed embodiments |
| H | 0.13 | 0.80 | 2.5 | 0.021 | 0.001 | 0.029 | 0.004 | 0.350 | 0.055 | 0.045 | 0.0019 | Ni: 0.500 | 794 | Within range of disclosed embodiments |
| I | 0.11 | 0.20 | 3.0 | 0.013 | 0.004 | 0.027 | 0.002 | 0.630 | 0.017 | 0.037 | 0.0011 | Cu: 0.200 | 755 | Within range of disclosed embodiments |
| J | 0.14 | 0.20 | 2.7 | 0.016 | 0.003 | 0.031 | 0.003 | 0.620 | 0.013 | 0.041 | 0.0007 | Ca: 0.001 | 755 | Within range of disclosed embodiments |
| K | 0.16 | 0.30 | 2.3 | 0.012 | 0.001 | 0.030 | 0.004 | 0.660 | 0.019 | 0.043 | 0.0014 | REM: 0.002 | 766 | Within range of disclosed embodiments |
| L | 0.08 | 0.40 | 2.6 | 0.006 | 0.003 | 0.035 | 0.001 | 0.550 | 0.009 | 0.035 | 0.0015 | — | 786 | Outside range of disclosed embodiments |
| M | 0.20 | 0.10 | 2.5 | 0.010 | 0.002 | 0.039 | 0.002 | 0.700 | 0.021 | 0.038 | 0.0015 | — | 741 | Outside range of disclosed embodiments |
| N | 0.11 | 0.50 | 1.4 | 0.011 | 0.002 | 0.028 | 0.002 | 0.810 | 0.015 | 0.040 | 0.0013 | — | 814 | Outside range of disclosed embodiments |
| O | 0.12 | 0.20 | 2.5 | 0.014 | 0.001 | 0.028 | 0.002 | 0.007 | 0.019 | 0.041 | 0.0012 | — | 774 | Outside range of disclosed embodiments |
| P | 0.14 | 0.50 | 2.1 | 0.013 | 0.003 | 0.026 | 0.001 | 0.580 | 0.002 | 0.038 | 0.0016 | — | 787 | Outside range of disclosed embodiments |
| Q | 0.13 | 0.30 | 2.7 | 0.018 | 0.001 | 0.031 | 0.003 | 0.510 | 0.019 | 0.002 | 0.0014 | — | 764 | Outside range of disclosed embodiments |
| R | 0.12 | 0.20 | 2.3 | 0.015 | 0.003 | 0.033 | 0.003 | 0.740 | 0.021 | 0.040 | 0.0002 | — | 771 | Outside range of disclosed embodiments |

Each of these steel slabs was heated to 1,200° C., then subjected to rough rolling and finishing rolling, and coiled to obtain a hot-rolled sheet. Then the hot-rolled sheet was cold-rolled to 1.4 mm to obtain a cold-rolled sheet, and the obtained cold-rolled sheet was subjected to annealing. The hot-rolling conditions and cold-rolling conditions are as shown in Tables 2 and 3. Each of the steel sheets produced under the conditions shown in Tables 2 and 3 was immersed in a galvanizing bath at 460° C. to form a hot-dip galvanized layer with a coating weight of 35 to 45 g/m², and then the resultant steel sheet was cooled at a cooling rate of 10° C./sec. to obtain a hot-dip galvanized steel sheet (GI). For some steel sheets, after the formation of the hot-dip galvanized layer, galvannealing treatment was performed at 530° C., and the resultant steel sheets were cooled at a cooing rate of 10° C./sec. to obtain hot-dip galvannealed steel sheets (GA).

TABLE 2

| Steel sheet No. | Steel | Hot rolling conditions | | | | Cold rolling conditions Rolling reduction ratio (%) | Annealing conditions | | | | | | | | | | Coated state* | Remarks |
|---|---|---|---|---|---|---|---|---|---|---|---|---|---|---|---|---|---|---|
| | | Rolling reduction ratio in final pass of finishing rolling (%) | Finishing rolling temperature (°C.) | Residence time at 600 to 700° C. (sec.) | Coiling temperature (°C.) | | Dew point (°C.) | Air ratio | Average heating rate (°C./sec.) | Annealing temperature (°C.) | Holding time during annealing (sec.) | Average cooling rate (°C./sec.) | Cooling stop temperature (°C.) | Holding time after stopping cooling (sec.) | Holding temperature after reheating (°C.) | Holding time after reheating (sec.) | | |
| 1 | A | 15 | 900 | 2 | 560 | 50 | −37 | 1.00 | 2.9 | 870 | 200 | 5 | 370 | 2 | 480 | 50 | GA | Example |
| 2 | | 20 | 870 | 2 | 580 | 50 | −30 | 1.05 | 3.4 | 850 | 300 | 10 | 400 | 2 | 500 | 100 | GI | Example |
| 3 | | 5 | 870 | 2 | 550 | 50 | −39 | 1.00 | 2.7 | 850 | 150 | 10 | 390 | 2 | 500 | 80 | GA | Comparative Example |
| 4 | | 15 | 800 | 2 | 550 | 50 | −38 | 1.01 | 2.7 | 850 | 150 | 10 | 390 | 2 | 500 | 80 | GA | Comparative Example |
| 5 | | 15 | 870 | 12 | 550 | 50 | −34 | 1.00 | 3.0 | 850 | 150 | 10 | 390 | 2 | 500 | 80 | GA | Comparative Example |
| 6 | | 15 | 870 | 2 | 620 | 50 | −40 | 1.01 | 3.0 | 880 | 150 | 10 | 390 | 2 | 500 | 80 | GA | Comparative Example |
| 7 | | 15 | 870 | 1 | 500 | 10 | −36 | 1.02 | 3.0 | 820 | 150 | 10 | 460 | 2 | 500 | 80 | GA | Comparative Example |
| 8 | | 15 | 870 | 1 | 500 | 50 | −33 | 1.05 | 3.1 | 820 | 150 | 10 | 390 | 2 | 500 | 80 | GA | Comparative Example |
| 9 | | 15 | 870 | 1 | 550 | 50 | −35 | 1.00 | 3.0 | 820 | 150 | 10 | 390 | 2 | 400 | 80 | GA | Comparative Example |
| 10 | | 15 | 870 | 1 | 550 | 50 | −32 | 1.00 | 3.0 | 820 | 150 | 10 | 400 | 2 | 480 | 1200 | GA | Comparative Example |
| 11 | | 15 | 870 | 2 | 550 | 50 | −38 | 1.01 | 3.4 | 820 | 150 | 10 | 400 | 2 | 500 | 5 | GA | Comparative Example |

TABLE 2-continued

| Steel sheet No. | Steel | Hot rolling conditions | | | | | Cold rolling conditions Rolling reduction ratio (%) | Annealing conditions | | | | | | | | | | Coated state* | Remarks |
|---|---|---|---|---|---|---|---|---|---|---|---|---|---|---|---|---|---|---|---|
| | | Rolling reduction ratio in final pass of finishing rolling (%) | Finishing rolling temperature (°C) | Residence time at 600 to 700°C (sec.) | Coiling temperature (°C) | | | Dew point (°C) | Air ratio | Average heating rate (°C/sec.) | Annealing temperature (°C) | Holding time during annealing (sec.) | Average cooling rate (°C/sec.) | Cooling stop temperature (°C) | Holding time after stopping cooling (sec.) | Holding temperature after reheating (°C) | Holding time after reheating (sec.) | | |
| 12 | | 15 | 870 | 2 | 550 | | 50 | −36 | 1.02 | 3.4 | 765 | 150 | 10 | 340 | 2 | 490 | 60 | GA | Comparative Example |
| 13 | | 15 | 870 | 2 | 550 | | 50 | −37 | 1.00 | 3.4 | 820 | 150 | 1 | 390 | 2 | 490 | 80 | GA | Comparative Example |
| 14 | B | 15 | 890 | 1 | 510 | | 65 | −36 | 1.00 | 2.5 | 860 | 100 | 15 | 390 | 2 | 460 | 50 | GA | Comparative Example |
| 15 | | 15 | 890 | 1 | 510 | | 65 | −50 | 1.01 | 2.5 | 860 | 100 | 15 | 390 | 2 | 460 | 50 | GA | Comparative Example |
| 16 | | 15 | 890 | 1 | 510 | | 65 | −41 | 0.75 | 2.5 | 860 | 100 | 15 | 390 | 2 | 460 | 50 | GA | Comparative Example |
| 17 | | 15 | 890 | 1 | 510 | | 65 | −37 | 1.01 | 2.5 | 860 | 100 | 15 | 180 | 2 | 460 | 50 | GA | Comparative Example |
| 18 | | 15 | 890 | 1 | 510 | | 65 | −39 | 1.02 | 2.5 | 860 | 100 | 15 | 390 | 10 | 460 | 50 | GA | Comparative Example |
| 19 | | 15 | 890 | 1 | 510 | | 65 | −33 | 1.00 | 2.5 | 860 | 100 | 15 | 390 | 2 | 600 | 50 | GA | Comparative Example |
| 20 | C | 15 | 930 | 5 | 500 | | 60 | −37 | 1.00 | 4.1 | 840 | 90 | 12 | 360 | 1 | 500 | 100 | GA | Comparative Example |
| 21 | | 15 | 930 | 5 | 500 | | 60 | −39 | 1.06 | 4.1 | 840 | 1300 | 12 | 360 | 1 | 500 | 100 | GA | Comparative Example |
| 22 | | 15 | 930 | 5 | 500 | | 60 | −35 | 1.01 | 4.1 | 840 | 90 | 12 | 360 | 0.2 | 500 | 100 | GA | Comparative Example |

*GI: Hot-dip galvanized steel sheet, GA: Hot-dip galvannealed steel sheet

TABLE 3

| Steel sheet No. | Steel | Hot rolling conditions | | | | | Cold rolling conditions Rolling reduction ratio (%) | Annealing conditions | | | | | | | | | | Coated state* | Remarks |
|---|---|---|---|---|---|---|---|---|---|---|---|---|---|---|---|---|---|---|---|
| | | Rolling reduction ratio in final pass of finishing rolling (%) | Finishing rolling temperature (° C.) | Residence time at 600 to 700° C. (sec.) | Coiling temperature (° C.) | | | Dew point (° C.) | Air ratio | Average heating rate (° C./sec.) | Annealing temperature (° C.) | Holding time during annealing (sec.) | Average cooling rate (° C./sec.) | Cooling stop temperature (° C.) | Holding time after stopping cooling (sec.) | Holding temperature after reheating (° C.) | Holding time after reheating (sec.) | | |
| 23 | D | 18 | 900 | 1 | 470 | | 55 | −34 | 1.11 | 1.9 | 810 | 200 | 10 | 410 | 4 | 480 | 60 | GA | Example |
| 24 | | 18 | 900 | 1 | 400 | | 55 | −32 | 1.01 | 1.9 | 810 | 200 | 10 | 410 | 4 | 480 | 60 | GA | Comparative Example |
| 25 | | 18 | 900 | 1 | 470 | | 55 | −37 | 1.00 | 1.9 | 810 | 5 | 10 | 410 | 4 | 480 | 60 | GA | Comparative Example |
| 26 | E | 15 | 880 | 2 | 540 | | 60 | −35 | 1.02 | 2.2 | 830 | 200 | 10 | 380 | 2 | 500 | 60 | GA | Example |
| 27 | | 15 | 880 | 2 | 540 | | 60 | −39 | 1.00 | 0.1 | 830 | 200 | 10 | 380 | 2 | 500 | 60 | GA | Comparative Example |
| 28 | | 15 | 880 | 2 | 540 | | 60 | −35 | 1.01 | 2.2 | 830 | 200 | 1 | 380 | 2 | 500 | 60 | GA | Comparative Example |
| 29 | F | 12 | 880 | 2 | 500 | | 50 | −36 | 1.03 | 3.9 | 850 | 200 | 10 | 400 | 2 | 490 | 100 | GA | Example |
| 30 | G | 12 | 880 | 2 | 520 | | 50 | −34 | 1.06 | 4.1 | 850 | 200 | 10 | 400 | 2 | 490 | 100 | GA | Example |
| 31 | H | 12 | 880 | 1 | 500 | | 40 | −35 | 1.00 | 4.1 | 900 | 200 | 10 | 360 | 2 | 530 | 100 | GA | Example |
| 32 | I | 12 | 880 | 1 | 560 | | 40 | −39 | 1.01 | 4.1 | 850 | 300 | 10 | 390 | 2 | 500 | 350 | GA | Example |
| 33 | | 12 | 880 | 1 | 560 | | 40 | −33 | 1.00 | 4.1 | 970 | 300 | 8 | 390 | 2 | 500 | 350 | GA | Comparative Example |

TABLE 3-continued

| Steel sheet No. | Steel | Hot rolling conditions | | | | Cold rolling conditions | Annealing conditions | | | | | | | | | | Coated state* | Remarks |
|---|---|---|---|---|---|---|---|---|---|---|---|---|---|---|---|---|---|---|
| | | Rolling reduction ratio in final pass of finishing rolling (%) | Finishing rolling temperature (°C) | Residence time at 600 to 700° C. (sec.) | Coiling temperature (°C) | Rolling reduction ratio (%) | Dew point (°C) | Air ratio | Average heating rate (°C/sec.) | Annealing temperature (°C) | Holding time during annealing (sec.) | Average cooling rate (°C/sec.) | Cooling stop temperature (°C) | Holding time after stopping cooling (sec.) | Holding temperature after reheating (°C) | Holding time after reheating (sec.) | | |
| 34 | J | 12 | 860 | 1 | 500 | 50 | −35 | 1.01 | 3.4 | 820 | 300 | 8 | 380 | 2 | 480 | 120 | GA | Example |
| 35 | K | 12 | 860 | 1 | 500 | 55 | −30 | 1.00 | 3.4 | 840 | 100 | 8 | 340 | 6 | 460 | 150 | GI | Example |
| 36 | L | 15 | 860 | 2 | 500 | 55 | −33 | 1.00 | 2.8 | 840 | 150 | 10 | 400 | 2 | 500 | 80 | GA | Comparative Example |
| 37 | M | 15 | 860 | 2 | 500 | 55 | −38 | 1.00 | 3.0 | 830 | 150 | 10 | 330 | 2 | 500 | 80 | GA | Comparative Example |
| 38 | N | 15 | 860 | 2 | 500 | 55 | −37 | 1.00 | 2.7 | 870 | 150 | 30 | 400 | 2 | 500 | 80 | GA | Comparative Example |
| 39 | O | 15 | 860 | 2 | 500 | 55 | −35 | 1.01 | 2.7 | 830 | 150 | 30 | 400 | 2 | 500 | 80 | GA | Comparative Example |
| 40 | P | 18 | 880 | 2 | 500 | 55 | −39 | 1.02 | 2.8 | 850 | 150 | 30 | 400 | 2 | 500 | 80 | GA | Comparative Example |
| 41 | Q | 18 | 880 | 2 | 500 | 55 | −40 | 1.02 | 2.9 | 830 | 150 | 30 | 400 | 2 | 500 | 80 | GA | Comparative Example |
| 42 | R | 18 | 880 | 2 | 500 | 55 | −35 | 1.00 | 2.9 | 830 | 150 | 30 | 400 | 2 | 500 | 80 | GA | Comparative Example |

*GI: Hot-dip galvanized steel sheet, GA: Hot-dip galvannealed steel sheet

Each of the obtained hot-dip galvanized steel sheets and hot-dip galvannealed steel sheets was subjected to skin pass rolling at a rolling reduction ratio of 0.3%, and the area fraction of each of the ferrite (F), martensite (M), tempered martensite (TM), bainitic ferrite (BF), and retained austenite was determined using the method described above. The average grain size of each of the massive martensite, tempered martensite, and bainitic ferrite was also determined.

The difference in hardness ΔHv, tensile properties, bendability, and the ability to absorb collision energy were determined using the following test methods.

<Hardness Test>

A test piece with a width of 10 mm and a length of 15 mm and having a cross section parallel to the rolling direction was prepared, and a Vickers hardness test was performed at a depth of 20 μm from a surface of the test piece and at a depth of 100 μm. The measurement was performed with a load of 50 g at five points for each depth, and the average of three Hv values other than the maximum and minimum Hv values was determined as the hardness Hv at the each depth. A value obtained by subtracting the hardness Hv at a depth of 20 μm from the hardness Hv at a depth of 100 μm was determined as the difference in hardness ΔHv.

<Tensile Test>

A JIS No. 5 tensile test piece (JIS Z2201) extending in a direction orthogonal to the rolling direction was prepared and subjected to a tensile test in accordance with the specifications of JIS Z 2241 at a strain rate of $10^{-3}$/sec. to determine yield strength (YS) and tensile strength (TS). A 0.2% proof stress was used as the YS. A test piece with a TS of 1,180 MPa or more was rated as pass.

<Bending Test>

A strip-shaped test piece having a width of 35 mm and a length of 100 mm was prepared and subjected to a bending test with a direction parallel to the rolling direction serving as a bending test direction. Specifically, a 90° V bending test was performed at a stroke rate of 10 mm/sec, a pressing load of 10 tons, a press holding time of 5 seconds, and a bending radius R of 1 mm. A ridge line portion of the bent edge was observed under a 10× magnifying glass. A test piece with a crack of 1 mm or more was rated as poor, and a test piece with a crack of less than 1 mm was rated as good.

<Impact Tensile Test>

A test piece having a parallel portion with a width of 5 mm and a length of 7 mm was prepared and subjected to a tensile test with a direction orthogonal to the rolling direction serving as a tensile test direction. The tensile test was performed at a strain rate of 2,000/sec. using an impact tensile tester utilizing a Hopkinson bar method. Absorbed energy (AE) until the amount of strain reached 5% was determined to evaluate the ability to absorb collision energy (anti-crash property) (see "TETSU TO HAGANE (Journal of the Iron and Steel Institute of Japan)", The Iron and Steel Institute of Japan, vol. 83 (1997), No. 11, p. 748-753). The absorbed energy (AE) was determined by integrating a stress-true strain curve in the strain range of 0 to 5%. A test piece with an AE/TS of 0.050 $J/m^3 \cdot Pa$ or more was rated as pass.

The results are shown in Tables 4 and 5.

TABLE 4

| Steel sheet No. | *Microstructure | | | | | | | | | | | Tensile properties | | Anti-crash property | | | |
|---|---|---|---|---|---|---|---|---|---|---|---|---|---|---|---|---|---|
| | V(F) (%) | V(BF) (%) | V(TM) (%) | V(M) (%) | V(γ) (%) | Others (%) | V(BF) − V(TM) (%) | V(M)/V(M) (%) | d(BF) (μm) | d(TM) (μm) | d(Mk) (μm) | Hardness ΔHv | YS (MPa) | TS (MPa) | Absorbed energy AE until 5% (MJ/m³) | AE/TS (J/m³·Pa) | Bendability | Remarks |
| 1 | 0 | 28 | 35 | 37 | 0 | 0 | −7 | 0 | 8.2 | 7.6 | 5.1 | 35 | 887 | 1215 | 68 | 0.056 | Good | Example |
| 2 | 0 | 26 | 25 | 49 | 0 | 0 | 1 | 1 | 7.8 | 7.9 | 5.3 | 46 | 952 | 1252 | 75 | 0.060 | Good | Example |
| 3 | 0 | 26 | 29 | 45 | 0 | 0 | −3 | 0 | 8.3 | 8.5 | 5.6 | 27 | 893 | 1238 | 66 | 0.053 | Poor | Comparative example |
| 4 | 0 | 25 | 28 | 47 | 0 | 0 | −3 | 0 | 8.3 | 8.3 | 5.7 | 25 | 888 | 1235 | 65 | 0.053 | Poor | Comparative example |
| 5 | 0 | 49 | 28 | 22 | 1 | 0 | 21 | 0 | 8.1 | 8.0 | 5.4 | 33 | 820 | 1154 | 60 | 0.052 | Poor | Comparative example |
| 6 | 0 | 51 | 29 | 19 | 1 | 0 | 22 | 0 | 8.3 | 8.2 | 5.5 | 35 | 812 | 1138 | 59 | 0.052 | Poor | Comparative example |
| 7 | 0 | 30 | 27 | 43 | 0 | 0 | 3 | 1 | 8.3 | 8.2 | 8.3 | 34 | 917 | 1248 | 61 | 0.049 | Poor | Comparative example |
| 8 | 0 | 25 | 0 | 75 | 0 | 0 | 25 | 8 | 16 | 16 | 5.6 | 41 | 908 | 1297 | 58 | 0.045 | Poor | Comparative example |
| 9 | 0 | 62 | 28 | 7 | 3 | 0 | 34 | 0 | 8.2 | 8.1 | 5.1 | 33 | 839 | 1145 | 60 | 0.052 | Poor | Comparative example |
| 10 | 0 | 59 | 29 | 3 | 1 | 8 | 30 | 0 | 8.0 | 8.1 | 5.2 | 37 | 735 | 906 | 60 | 0.066 | Good | Comparative example |
| 11 | 0 | 12 | 27 | 61 | 0 | 0 | −15 | 4 | 8.1 | 7.8 | 6.0 | 35 | 928 | 1274 | 69 | 0.054 | Poor | Comparative example |
| 12 | 23 | 22 | 28 | 26 | 1 | 0 | −6 | 0 | 2.3 | 2.8 | 1.8 | 38 | 844 | 1208 | 58 | 0.048 | Poor | Comparative example |
| 13 | 13 | 23 | 21 | 43 | 0 | 0 | 2 | 2 | 7.6 | 6.9 | 4.8 | 35 | 817 | 1184 | 57 | 0.048 | Good | Example |
| 14 | 0 | 29 | 31 | 40 | 0 | 0 | −2 | 1 | 8.4 | 8.2 | 5.9 | 32 | 896 | 1208 | 68 | 0.056 | Good | Example |
| 15 | 0 | 29 | 30 | 41 | 0 | 0 | −1 | 1 | 8.1 | 8.3 | 5.8 | 10 | 885 | 1205 | 66 | 0.055 | Poor | Comparative example |
| 16 | 0 | 30 | 30 | 40 | 0 | 0 | 0 | 0 | 8.2 | 8.3 | 5.7 | 15 | 890 | 1208 | 68 | 0.056 | Poor | Comparative example |
| 17 | 0 | 3 | 94 | 1 | 2 | 0 | −91 | 0 | 3.5 | 8.5 | 2.9 | 33 | 862 | 1079 | 72 | 0.067 | Good | Example |
| 18 | 0 | 53 | 29 | 17 | 1 | 0 | 24 | 0 | 7.5 | 8.4 | 5.0 | 35 | 823 | 1128 | 61 | 0.054 | Poor | Comparative example |
| 19 | 18 | 8 | 29 | 45 | 0 | 0 | −21 | 2 | 6.6 | 8.5 | 5.6 | 34 | 737 | 1167 | 44 | 0.038 | Poor | Comparative example |
| 20 | 0 | 33 | 45 | 22 | 0 | 0 | −12 | 2 | 7.2 | 7.4 | 4.5 | 35 | 950 | 1228 | 77 | 0.063 | Good | Example |
| 21 | 0 | 35 | 42 | 23 | 0 | 0 | −7 | 2 | 15 | 16 | 9.0 | 38 | 892 | 1214 | 56 | 0.046 | Poor | Comparative example |
| 22 | 0 | 29 | 36 | 35 | 0 | 0 | −7 | 9 | 7.4 | 7.3 | 5.1 | 38 | 933 | 1239 | 58 | 0.047 | Poor | Comparative example |

*V(F): Area fraction of ferrite, V(BF): Area fraction of bainitic ferrite, V(M): Area fraction of martensite, V(M'): Area fraction of martensite phase regions which are contiguous only to martensite phase regions
V(TM): Area fraction of tempered martensite, V(γ): Area fraction of retained austerfte, Others: Area fraction of other phases
d(BF): Average grain size of bainitic ferrite, d(TM): Average grain size of tempered martensite, d(Mk): Average grain size of massive martensite
ΔHv: Value obtained by subtracting the Vickers hardness of a steel sheet at a depth of 20 μm from its surface from the Vickers hardness at a depth of 100 μm from the steel sheet surface

TABLE 5

| Steel sheet No. | *Microstructure | | | | | | | | | | | Tensile properties | | Anti-crash property Absorbed energy AE until 5% (MJ/m³) | AE/TS (J/m³·Pa) | Bendability | Remarks |
|---|---|---|---|---|---|---|---|---|---|---|---|---|---|---|---|---|---|
| | V(F) (%) | V(BF) (%) | V(TM) (%) | V(M) (%) | V(γ) (%) | Others (%) | V(BF) − V(TM) (%) | V(M)/V(M) (%) | d(BF) (μm) | d(TM) (μm) | d(Mk) (μm) | Hardness ΔHv | YS (MPa) | TS (MPa) | | | | |
| 23 | 0 | 40 | 22 | 37 | 1 | 0 | 18 | 0 | 6.9 | 7.2 | 5.2 | 50 | 916 | 1220 | 72 | 0.059 | Good | Example |
| 24 | 0 | 39 | 23 | 37 | 1 | 0 | 16 | 0 | 6.6 | 6.7 | 4.9 | 22 | 925 | 1226 | 74 | 0.060 | Poor | Comparative example |
| 25 | 28 | 25 | 2 | 45 | 0 | 0 | 23 | 0 | 2.9 | 3.3 | 3.6 | 35 | 870 | 1192 | 54 | 0.045 | Poor | Comparative example |
| 26 | 0 | 34 | 41 | 25 | 0 | 0 | −7 | 0 | 7.5 | 7.6 | 5.6 | 37 | 930 | 1202 | 75 | 0.062 | Good | Example |
| 27 | 0 | 37 | 40 | 22 | 1 | 0 | −3 | 0 | 16 | 15 | 8.6 | 31 | 849 | 1193 | 52 | 0.044 | Poor | Comparative example |
| 28 | 11 | 31 | 34 | 24 | 0 | 0 | −3 | 0 | 7.2 | 7.5 | 5.4 | 35 | 768 | 1176 | 51 | 0.043 | Poor | Comparative example |
| 29 | 0 | 23 | 28 | 49 | 0 | 0 | −5 | 1 | 4.9 | 5.1 | 4.8 | 38 | 937 | 1231 | 76 | 0.062 | Good | Example |
| 30 | 0 | 28 | 27 | 45 | 0 | 0 | 1 | 0 | 6.5 | 6.7 | 5.9 | 44 | 924 | 1238 | 73 | 0.059 | Good | Example |
| 31 | 0 | 32 | 40 | 28 | 0 | 0 | −8 | 1 | 8.5 | 8.1 | 6.5 | 36 | 910 | 1244 | 70 | 0.056 | Good | Example |
| 32 | 0 | 23 | 30 | 47 | 0 | 0 | −7 | 0 | 7.8 | 7.8 | 6.3 | 32 | 922 | 1211 | 73 | 0.060 | Good | Example |
| 33 | 0 | 22 | 32 | 46 | 0 | 0 | −10 | 2 | 18 | 18 | 13 | 34 | 839 | 1199 | 49 | 0.041 | Poor | Comparative example |
| 34 | 0 | 28 | 31 | 41 | 0 | 0 | −3 | 0 | 6.4 | 6.2 | 4.7 | 34 | 931 | 1258 | 74 | 0.059 | Good | Example |
| 35 | 0 | 39 | 45 | 16 | 0 | 0 | −6 | 0 | 8.3 | 8.1 | 4.5 | 40 | 986 | 1269 | 81 | 0.064 | Good | Example |
| 36 | 0 | 58 | 34 | 7 | 1 | 0 | 24 | 0 | 7.6 | 7.8 | 3.4 | 34 | 753 | 1045 | 54 | 0.052 | Poor | Comparative example |
| 37 | 0 | 18 | 20 | 62 | 0 | 0 | −2 | 4 | 7.8 | 7.6 | 5.7 | 38 | 802 | 1315 | 50 | 0.038 | Poor | Comparative example |
| 38 | 0 | 53 | 40 | 5 | 1 | 1 | 13 | 0 | 7.4 | 8.1 | 3.4 | 33 | 656 | 893 | 51 | 0.057 | Good | Comparative example |
| 39 | 0 | 55 | 35 | 9 | 1 | 0 | 20 | 0 | 7.8 | 8.3 | 3.7 | 36 | 672 | 933 | 52 | 0.056 | Good | Comparative example |
| 40 | 0 | 61 | 26 | 11 | 2 | 0 | 35 | 0 | 7.6 | 8.2 | 3.8 | 35 | 692 | 997 | 50 | 0.050 | Good | Comparative example |
| 41 | 0 | 26 | 29 | 45 | 0 | 0 | −3 | 1 | 13 | 16 | 16 | 35 | 853 | 1231 | 48 | 0.039 | Poor | Comparative example |
| 42 | 0 | 50 | 28 | 22 | 0 | 0 | 22 | 0 | 7.7 | 8.1 | 5.2 | 35 | 771 | 1048 | 58 | 0.055 | Poor | Comparative example |

*V(F): Area fraction of ferrite, V(BF): Area fraction of bainitic ferrite, V(M): Area fraction of martensite, V(γ): Area fraction of retained austenite, Others: Area fraction of other phases
V(TM): Area fraction of tempered martensite, V(Mk): Area fraction of martensite phase regions which are contiguous only to martensite phase regions
d(BF): Average grain size of bainitic ferrite, d(TM): Average grain size of tempered martensite, d(Mk): Average grain size of massive martensite
ΔHv: Value obtained by subtracting the Vickers hardness of a steel sheet at a depth of 20 μm from its surface from the Vickers hardness at a depth of 100 μm from the steel sheet surface It can be found that, in each example of the disclosed embodiments, the TS is 1,180 MPa or more and the AE/TS is 0.050 J/m$^3$·Pa or more, so that high anti-crash property and good bendability are achieved.

According to the disclosed embodiments, a high-strength hot-dip galvanized steel sheet excellent in anti-crash property and bendability is obtained. This steel sheet can contribute to a reduction in weight of automobiles and has significant contribution to an improvement in performance of automobile bodies, and therefore advantageous effects can be achieved.

INDUSTRIAL APPLICABILITY

According to the disclosed embodiments, a high-strength hot-dip galvanized steel sheet having a TS of 1,180 MPa or more and excellent in anti-crash property and bendability can be obtained. When the high-strength hot-dip galvanized steel sheet of the present invention is used for an automobile part application, the steel sheet can contribute to a reduction in weight of automobiles and can thereby contribute significantly to an improvement in performance of automobile bodies.

The invention claimed is:

1. A high-strength hot-dip galvanized steel sheet having a surface coated with a hot-dip galvanized coating, the steel sheet having a chemical composition comprising:
C: more than 0.10% and less than 0.18%, by mass %;
Si: 0.01 to 1.00%, by mass %;
Mn: 1.5 to 4.0%, by mass %;
P: 0.100% or less, by mass %;
S: 0.020% or less, by mass %;
Al: 0.010 to 0.500%, by mass %;
Cr: 0.010 to 2.000%, by mass %;
Nb: 0.005 to 0.100%, by mass %;
Ti: 0.005 to 0.100%, by mass %;
B: more than 0.0005% and 0.0030% or less, by mass %; and
Fe and incidental impurities,
wherein the steel sheet has a microstructure including ferrite having an area fraction in the range of 0 to 10%, martensite having an area fraction in the range of 15 to 60%, tempered martensite having an area fraction in the range of 20 to 50%, and bainitic ferrite having an area fraction in the range of 20 to 50%,
massive martensite, the tempered martensite, and the bainitic ferrite each have an average grain size of 15 μm or less,
a value obtained by subtracting the area fraction of the tempered martensite from the area fraction of the bainitic ferrite is 20% or less,
an area fraction of martensite phase regions which are contiguous only to martensite phase regions with respect to a total area fraction of martensite phase regions is 5% or less, and
a value obtained by subtracting a Vickers hardness at a depth of 20 μm from a surface of the steel sheet from a Vickers hardness at a depth of 100 μm from the surface of the steel sheet is 30 or more.

2. The high-strength hot-dip galvanized steel sheet according to claim 1, further comprising at least one element selected from the group consisting of Mo: 0.005 to 2.000%, by mass %, V: 0.005 to 2.000%, by mass %, Ni: 0.005 to 2.000%, by mass %, and Cu: 0.005 to 2.000%, by mass %.

3. The high-strength hot-dip galvanized steel sheet according to claim 1, further comprising at least one element selected from the group consisting of Ca: 0.001 to 0.005%, by mass %, and REMs: 0.001 to 0.005%, by mass %.

4. The high-strength hot-dip galvanized steel sheet according to claim 1, wherein the hot-dip galvanized coating is a hot-dip galvannealed coating.

5. A method for producing a high-strength hot-dip galvanized steel sheet according to claim 1, the method comprising:
hot-rolling a slab at a finishing rolling temperature in the range of 850 to 950° C. such that a rolling reduction ratio in a final finishing pass is 10% or more, the slab having a chemical composition comprising:
C: more than 0.10% and less than 0.18%, by mass %,
Si: 0.01 to 1.00%, by mass %,
Mn: 1.5 to 4.0%, by mass %,
P: 0.100% or less, by mass %,
S: 0.020% or less, by mass %,
Al: 0.010 to 0.500%, by mass %,
Cr: 0.010 to 2.000%, by mass %,
Nb: 0.005 to 0.100%, by mass %,
Ti: 0.005 to 0.100%, by mass %,
B: more than 0.0005% and 0.0030% or less, by mass %, and
Fe and incidental impurities;
cooling the resultant slab such that a residence time in a temperature range of from 600 to 700° C. is 10 seconds or shorter;
coiling the resultant slab at a coiling temperature in the range of 450° C. to less than 600° C. to form a hot-rolled sheet;
cold-rolling the hot-rolled sheet at a rolling reduction ratio of more than 20% to form a cold-rolled sheet;
annealing the cold-rolled sheet at an annealing temperature in the range of (Ac$_3$ transformation temperature −20° C.) to 950° C. by heating the cold-rolled sheet such that, in a temperature range of from 300° C. to the annealing temperature, the cold-rolled sheet is heated at an average heating rate of 0.5° C./s or more with a dew point in the range of −45° C. to 20° C. and an air ratio of 0.80 or more and then holding the cold-rolled sheet at the annealing temperature for a holding time in the range of 10 to 1,000 seconds;
cooling the resultant cold-rolled sheet to a cooling stop temperature in the range of 200° C. to less than 450° C. at an average cooling rate of 5° C./s or more;
holding the cold-rolled sheet at the cooling stop temperature for a holding time in the range of 1 second to less than 10 seconds;
then reheating the cold-rolled sheet to a reheating temperature in the range of −450° C. to 550° C. and holding the cold-rolled sheet at the reheating temperature for in the range of 10 to 1,000 seconds; and
then subjecting the resultant cold-rolled sheet to hot-dip galvanizing treatment.

6. The method for producing a high-strength hot-dip galvanized steel sheet according to claim 5, further comprising, after the hot-dip galvanizing treatment, subjecting the galvanized cold-rolled sheet to galvannealing treatment.

7. The method for producing a high-strength hot-dip galvanized steel sheet according to claim 5, wherein the chemical composition further comprises at least one element selected from the group consisting of Mo: 0.005 to 2.000%, by mass %, V: 0.005 to 2.000%, by mass %, Ni: 0.005 to 2.000%, by mass %, and Cu: 0.005 to 2.000%, by mass %.

8. The method for producing a high-strength hot-dip galvanized steel sheet according to claim 5, wherein the chemical composition further comprises at least one element selected from the group consisting of Ca: 0.001 to 0.005%, by mass %, and REMs: 0.001 to 0.005%, by mass %.

9. The method for producing a high-strength hot-dip galvanized steel sheet according to claim 7, wherein the chemical composition further comprises at least one element selected from the group consisting of Ca: 0.001 to 0.005%, by mass %, and REMs: 0.001 to 0.005%, by mass %.

10. The method for producing a high-strength hot-dip galvanized steel sheet according to claim 7, further comprising, after the hot-dip galvanizing treatment, subjecting the galvanized cold-rolled sheet to galvannealing treatment.

11. The method for producing a high-strength hot-dip galvanized steel sheet according to claim 8, further comprising, after the hot-dip galvanizing treatment, subjecting the galvanized cold-rolled sheet to galvannealing treatment.

12. The method for producing a high-strength hot-dip galvanized steel sheet according to claim 9, further comprising, after the hot-dip galvanizing treatment, subjecting the galvanized cold-rolled sheet to galvannealing treatment.

13. The high-strength hot-dip galvanized steel sheet according to claim 2, further comprising at least one element selected from the group consisting of Ca: 0.001 to 0.005%, by mass %, and REMs: 0.001 to 0.005%, by mass %.

14. The high-strength hot-dip galvanized steel sheet according to claim 2, wherein the hot-dip galvanized coating is a hot-dip galvannealed coating.

15. The high-strength hot-dip galvanized steel sheet according to claim 3, wherein the hot-dip galvanized coating is a hot-dip galvannealed coating.

16. The high-strength hot-dip galvanized steel sheet according to claim 13, wherein the hot-dip galvanized coating is a hot-dip galvannealed coating.

* * * * *